Patented Apr. 27, 1926.

1,582,742

UNITED STATES PATENT OFFICE.

JOHN W. FORBING, OF ALBANY, NEW YORK, ASSIGNOR TO THE BAYER CO. INC., OF RENSSELAER, NEW YORK, A CORPORATION OF NEW YORK.

READILY-SOLUBLE SILVER-PROTEIN TABLET AND THE LIKE.

No Drawing.   Application filed November 9, 1925.  Serial No. 68,005.

*To all whom it may concern:*

Be it known that I, JOHN W. FORBING, a citizen of the United States, residing at #7 Delaware Terrace, city of Albany, in the county of Albany and State of New York, have invented certain new and useful Improvements in Readily-Soluble Silver-Protein Tablets and the like, of which the following is a specification.

The present invention relates to the preparation of readily and quickly soluble tablets or analogous bodies comprising silver protein compounds of the type disclosed in United States Patent Number 615,970.

Silver protein compounds are soluble in water, but the preparation of solutions thereof is somewhat difficult and troublesome. If a quantity of a silver protein compound in powdered form is wetted with water and the mixture stirred, the particles apparently become gummy or gelatinous and stick together and smear upon the walls of the receptacle, dissolving only very slowly. Larger bodies of silver protein compounds such as tablets or similar bodies, formed by compressing a powder of a silver protein compound dissolve very slowly in water.

The usual method followed in the preparation of a solution of a silver protein compound is to sprinkle it in powdered form upon the surface of a body of water and to allow the solution of the particles to take place without agitation. In this way advantage is taken of the greater dissolving surface presented by a fine powder as compared with larger bodies and the agglomeration of the particles and smearing on the walls of the receptacle are avoided, but the preparation of a solution in this way is too slow and tedious for popular use. It has been attempted to prepare readily soluble effervescent tablets of silver protein compounds, this being a common expedient for promoting the quick solution of a solid material, but extensive experimental work along this line has failed to give a satisfactory product.

I have now found that by mixing the silver protein compounds in powdered form with effervescent materials such as mixtures of solid acids or acid salts and carbonates or bicarbonates, and also with a desiccating or dehydrating material such as anhydrous sodium sulfate, and compressing the mixtures, readily and quickly soluble tablets or analogous bodies capable of being stored for a relatively long period of time, even in contact with atmospheric air without deterioration, may be prepared.

In the preparation of readily soluble tablets containing silver protein compounds in accordance with my invention the well known practice for the preparation of effervescent tablets may be followed and the usual effervescent combinations of solid acids or acid salts such as citric acid, tartaric acid, monosodium phosphate, etc., and compounds capable of liberating carbon dioxid by reaction with the acid or acid salt such as sodium bicarbonate, may be used. The desiccating or dehydrating agent should be one such as anhydrous sodium sulfate, magnesium sulfate, disodium phosphate, etc., which does not become wet or moist on hydrating, anhydrous sodium sulfate being admirably suited for the purpose.

For the purpose of illustration the following example is given: 21 parts by weight of citric acid, 50.4 parts by weight of sodium bicarbonate, 29.6 parts of anhydrous sodium sulfate, and 50.0 parts by weight of a silver protein compound, all in dry powdered form, are thoroughly mixed and the mixture compressed into tablet form in the usual way. Such tablets when dropped into water dissolve quickly and completely without agitation.

It is of course understood that the proportions of the silver protein compound, the effervescent mixture and the dehydrating agent may be varied within a rather wide range and that the specific effervescent mixture and dehydrating agent given in the foregoing example may be replaced by other known effervescent mixtures and dehydrating agents without departing from my invention. It is also understood that other active or inactive materials may be added to the tablet mixture and that the tablets may be coated if desired without departing from my invention.

The effervescent materials in the tablets apparently serve the usual purpose of disintegrating the tablets, distributing the particles of the silver protein compound throughout the solvent and also providing a certain amount of agitation. The action of the dehydrating agent is not precisely known, but apparently it may serve to preserve the effervescent material and also to prevent the particles of silver protein compound from becoming moist and sticking together, particularly on the surface of the tablets where the exposed particles of silver protein compound might, by absorbing moisture from the air, become plastic or adhesive and weld together, forming a more or less impervious and slowly soluble coating around the interior of the tablet.

This application is a continuation in part of my application Serial Number 757,577, filed December 22, 1924.

I claim:—

1. As a new article of manufacture, readily soluble compressed solid bodies containing a silver protein compound, an effervescent material and a desiccating material.

2. As a new article of manufacture, readily soluble compressed solid bodies comprising a mixture of a silver protein compound, an effervescent material and anhydrous sodium sulfate.

In testimony whereof I affix my signature.

JOHN W. FORBING.